H. A. REYNOLDS.
Velocipede.

No. 46,705.

Patented Mar. 7, 1865.

UNITED STATES PATENT OFFICE.

HARVEY A. REYNOLDS, OF NEW YORK, N. Y.

IMPROVEMENT IN VELOCIPEDE TROTTING OR PACING HORSE.

Specification forming part of Letters Patent No. 46,705, dated March 7, 1865.

*To all whom it may concern:*

Figure 1:
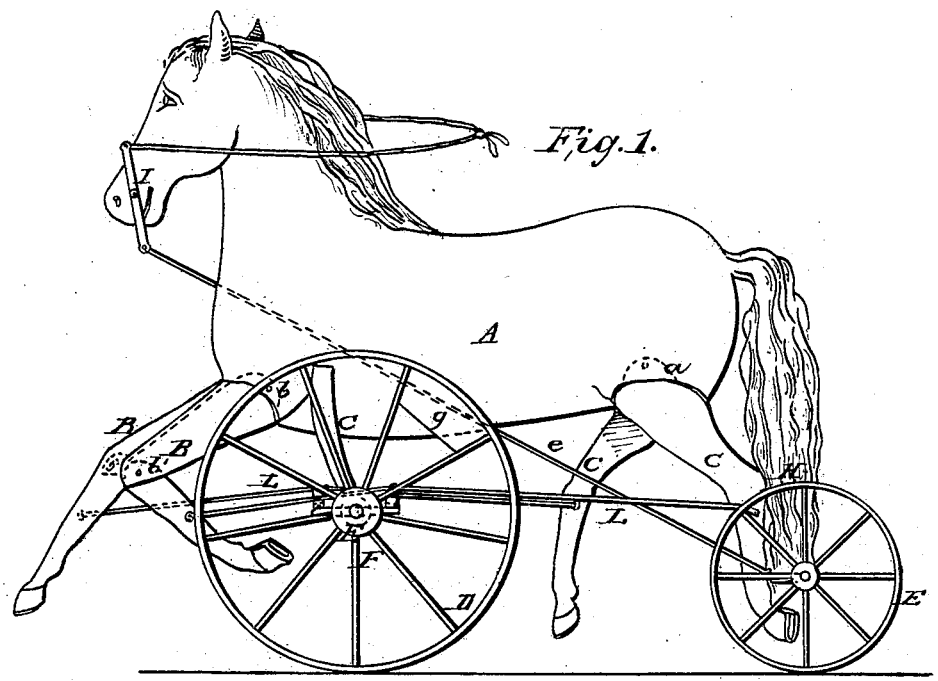
Figure 2:
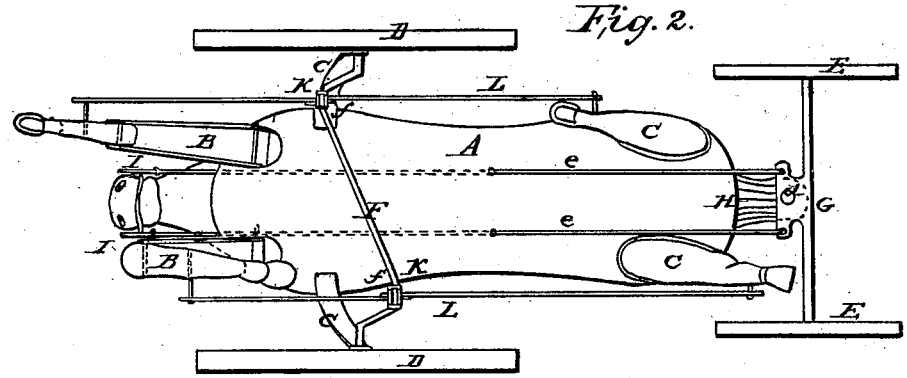
Figure 3:
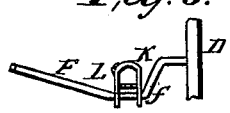

Be it known that I, HARVEY A. REYNOLDS, of the city, county, and State of New York, have invented a new and Improved Velocipede Trotting or Pacing Horse; and I do hereby declare that the following is a full, clear, and exact description thereof, which will enable others skilled in the art to make and use the same, reference being had to the accompanying drawings, forming part of this specification, in which, Figure 1 is a side view of my invention; Fig. 2, an under view or an inverted plan of the same; Fig. 3, a detached view of a portion of an axle pertaining to the same.

Similar letters of reference indicate like parts.

This invention relates to a new and improved toy or velocipede horse for children; and it consists in having the horse mounted on wheels, the axle of the driving ones of which is provided with cranks having stirrups applied to them and arranged in such a manner that the driving-wheels may be turned by a direct application of the feet of the rider to them.

The invention further consists in having the legs of the horse jointed and connected with the cranks of axle in such a manner that they will as the horse is propelled along have a trotting or pacing movement.

A represents the body of the horse, B the forelegs, and C the hind legs. The latter have but one joint, $a$, and that is where they are connected with the body, the fore legs having two joints, $b\ b'$, the former, $b$, connecting the legs with the body, and the latter, $b'$, being at the knee-joint. (See Fig. 1.) The horse is mounted on four wheels, D D E E, the former, D, being the driving ones and having their axle F fitted in bearings $c\ c'$, attached to body A. The hind wheels, E E, are on an axle, G, which works on a king-bolt, $d$, that enters or works into the lower end of the tail H of the horse. These hind wheels are used in steering or guiding the horse, and the axle G has two wires, $e\ e$, attached to it, which pass up through the body A to its head, and are attached to levers I, which are pivoted one to each side of the head, and have a guide-rein, J, connected to their upper ends. The axle F of the front or driving wheels is formed with two cranks, $f\ f$, in reverse or opposite positions, each crank having a stirrup, K, attached to it to receive the foot of the rider, and to these stirrups K are connected two rods, L, which are secured at their front ends to the lower parts of the front legs, B, the back ends of the rods being attached to the hind legs, C. The wheels C are each provided with a weight, $g$, to assist in throwing the cranks $f$ past their centers.

By this arrangement the horse may be propelled along by the rider with the greatest facility, and with but a moderate exertion or application of power, as the feet of the rider are applied directly to the axle, all treadles, levers, &c., hitherto used for similar or analogous purposes being dispensed with.

I claim as new and desire to secure by Letters Patent—

1. A velocipede trotting or pacing horse mounted on wheels, and having the axle of the forward or driving wheels provided with reversed cranks to act on the jointed legs B B, substantially as explained.

2. The jointed legs B C, connected by rods L, and the latter secured to the stirrups K of the axle of the driving-wheels, substantially as and for the purpose specified.

HARVEY A. REYNOLDS.

Witnesses:
　M. M. LIVINGSTON,
　C. L. TOPLIFF.